July 21, 1931.  L. M. SHERIDAN  1,815,334

VARIABLE SPEED MECHANISM

Filed May 3, 1930

INVENTOR.
L M Sheridan
BY E J Fetherstonhaugh
ATTORNEY.

Patented July 21, 1931

1,815,334

UNITED STATES PATENT OFFICE

LESLIE MITCHELL SHERIDAN, OF COPPERCLIFF, ONTARIO, CANADA

VARIABLE SPEED MECHANISM

Application filed May 3, 1930. Serial No. 449,584.

This invention relates to a variable speed mechanism, as described in the present specification and illustrated in the accompanying drawings which form part of same.

The invention consists essentially of the novel features of construction pointed out in the claim for novelty following a description containing an explanation in detail of an acceptable form of the invention.

The objects of this invention are to furnish a means whereby the speed of rotation of a driven shaft may be varied directly in proportion to the rotative speed of the outer casing; to construct a device simple in construction but capable of transmitting a heavy load in relation to its size; to facilitate the transmission of loads having a varying intensity and to enable the operator to vary the speed of the driven shaft to conform to the operating conditions and to generally provide a centrifugal speed changer, simple in operation and compact in its construction and of great utility in its particular field.

In the drawings, Figure 1 is a side elevation of the complete device.

Like numerals of reference indicate corresponding parts in the various figures.

Figure 1:
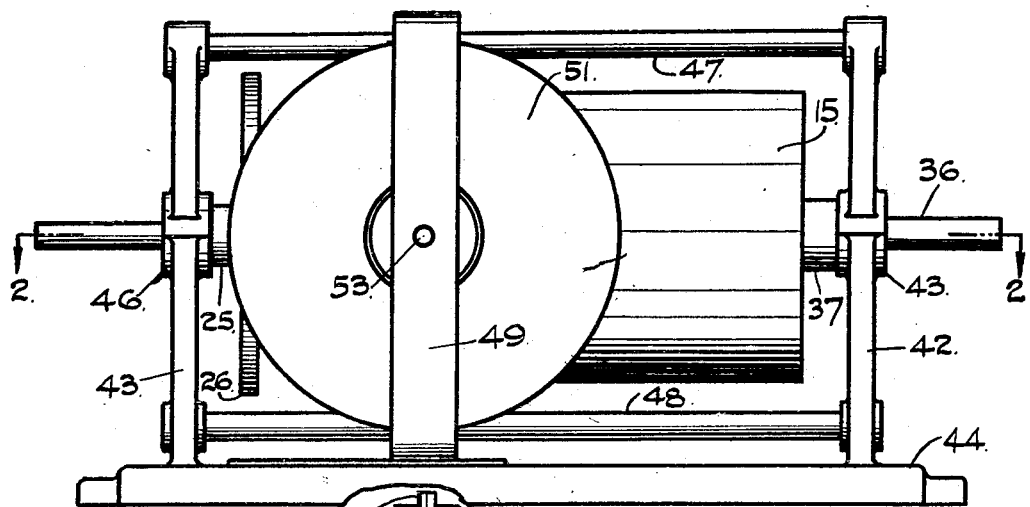
Figure 2:
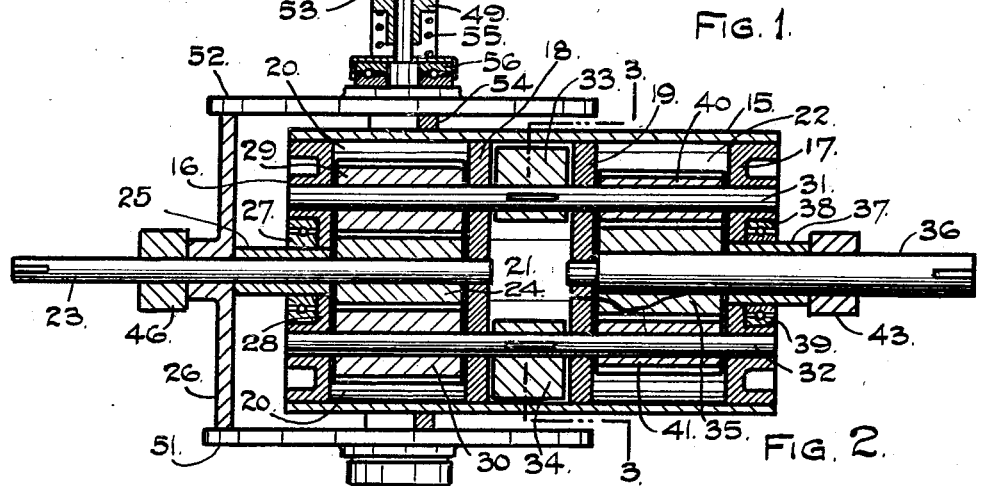
Figure 2 is a sectional plan view taken on the line 2—2 in Figure 1.
Figure 3:
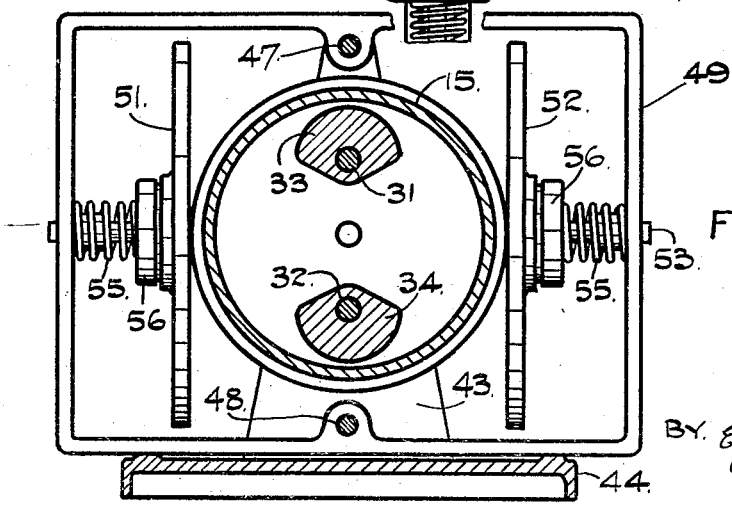
Figure 3 is a sectional elevation taken on the line 3—3 in Figure 2.

Referring to the drawings the numeral 15 indicates a circular casing enclosing the end walls 16 and 17 and the intermediate walls 18 and 19 thus forming three separate compartments 20, 21, 22.

The drive shaft 23 has the gear 24 fixedly secured thereto within the compartment 20, the end of said shaft 23 projecting through the gear and is journalled in the intermediate wall 18. The sleeve 25 encircles the shaft 23 and abuts the gear 24 at one end, the other end abutting a friction disc 26 keyed to the said driving shaft 23. The ball bearing 27 encircles the sleeve 25 and fits into a recess 28 in the end wall 16.

The gears 29 and 30 mesh with the gear 24 and are keyed to the shafts 31 and 32 which extend the length of the casing and are journalled in a suitable manner in the end and intermediate walls thereof.

The compartment 21 contains the eccentric balance weights 33 and 34 which are keyed to the shafts 31 and 32 and rotate therewith.

The compartment 22 contains the gear 35 fixedly secured to the driven shaft 36 which is encircled by the sleeve 37 having a ball bearing 38 mounted thereon, said ball bearing 38 fitting into the recess 39 of the end wall 17. The gears 40 and 41 mesh with the gear 35 and are keyed to the shafts 31 and 32 and rotate therewith.

The casing and shafts are supported by the pedestals 42 and 43 fixedly secured or forming part of the bedplate 44 the shaft 23 being journalled in the bearing 46. It will thus be seen that the mechanism hereinbefore described can freely rotate on the shafts 28 and 36 above the bedplate 44.

In the operation of this invention, the driving shaft 23 is suitably coupled to the prime mover and is journalled in the end wall of the casing 15 and on this shaft is mounted the sun gear 24 which coacts with the planet gears 29 and 30 mounted on the gear shafts 31 and 32 within the compartment 20.

The two gear shafts extend through the walls 18 and 19 of the compartment 21 and into the compartment 22 which contains the planet wheels 40 and 41, said gears being keyed to the gear shafts and rotate therewith. The sun wheel 35 is keyed to the driven shaft 36 and coacts with the planet gears 40 and 41, the driven shaft being journalled in the end wall 17 of the casing 15.

It will therefore be seen that the casing 15 is freely mounted on the driving and driven shafts and may be rotated independently of said shafts. If the casing 15 is held stationary it is obvious that if the driving shaft 23 is rotated there will be a direct drive through the planetary gearing to the driven shaft 36 but if the casing 15 is rotated there will be a certain amount of lost motion between the sun wheel 24 on the driving shaft and the planetary gears 29 and 30 rotating therearound owing to the teeth on the sun wheel 24 having to travel through a greater distance to coact with the corresponding teeth on the planetary gears. The planetary gears 40 and 41 being secured to the same shaft as the gears 29 and 30 will consequently rotate the sun wheel 34 and the driven shaft at a relatively slower speed than the drive shaft is rotating.

The eccentric balance weights 33 and 34 are keyed to the gear shafts 31 and 32 within the compartment 21 and rotate with said shafts in a plane at right angles to the axis of the casing and it will be seen that when rotating they impart a series of impulses towards this axis which has the effect of causing the casing to lag or retard its rotation so that in the event of a sudden falling off of the load on the driven shaft these weights check any tendency for the casing to suddenly speed up but allows the mechanism to accommodate itself to the new condition without any undue strain being placed on the casing or gears.

To facilitate the rotation of the casing 15 the friction discs 26, 51, and 52 are used. The friction disc 26 is keyed to the driving shaft and rotating therewith and the friction wheels 51 and 52 are mounted on the sliding frame 49 and are held into contact with the disc 26 and the friction ring 54 forming part of the casing 15 by the springs 55 abutting the thrust bearings 56.

It will therefore be seen that by sliding the center of rotation of the discs 51 and 52 by means of the sliding frame 49 closer or away from the disc 26 the speed or rotation of the casing 15 may be varied correspondingly which in turn varies the speed of the driven shaft 36 through a considerably wide range.

In the foregoing specification only one form of drive for the casing has been described and illustrated but it must be remembered that the casing can be driven by a belt in which case the casing becomes a pulley, or by chains or gears and the balance weights 33 and 34 may be omitted without anyway altering the principles underlying the invention.

What I claim is:

A variable speed mechanism comprising a driving shaft and a driven shaft journalled within the end walls of a cylindrical casing and intermediate walls therein supporting the ends of said shafts and sun gears fixedly secured to said shafts coacting with a plurality of planet gears fixedly secured to gear shafts and eccentric balance weights secured to said shafts intermediate of said planet gears and a friction wheel secured to said driving shaft and a friction ring encircling said casing and a slidable frame adjustably mounted on slide bars and having a pair of friction wheels mounted thereon spring held into engagement with said first named friction varying the rotative speed of the casing in relation to the speed of the driving shaft.

Signed at Toronto, Canada, this 3rd day of April, 1930.

LESLIE MITCHELL SHERIDAN.